United States Patent
Kikkawa et al.

(10) Patent No.: US 9,286,204 B2
(45) Date of Patent: Mar. 15, 2016

(54) MEMORY CONTROLLER

(75) Inventors: Koji Kikkawa, Tokyo (JP); Masanori Nakata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 146 days.

(21) Appl. No.: 13/982,555

(22) PCT Filed: Jan. 31, 2011

(86) PCT No.: PCT/JP2011/051959
§ 371 (c)(1),
(2), (4) Date: Jul. 30, 2013

(87) PCT Pub. No.: WO2012/104974
PCT Pub. Date: Aug. 9, 2012

(65) Prior Publication Data
US 2013/0311716 A1    Nov. 21, 2013

(51) Int. Cl.
*G06F 12/02*    (2006.01)

(52) U.S. Cl.
CPC .... *G06F 12/0246* (2013.01); *G06F 2212/1016* (2013.01); *G06F 2212/1044* (2013.01); *G06F 2212/1048* (2013.01); *G06F 2212/7201* (2013.01); *G06F 2212/7211* (2013.01)

(58) Field of Classification Search
CPC .................................................. G06F 12/0246
See application file for complete search history.

(56) References Cited

U.S. PATENT DOCUMENTS

| | | | | |
|---|---|---|---|---|
| 5,544,356 | A | * | 8/1996 | Robinson et al. ............. 707/821 |
| 2004/0083335 | A1 | | 4/2004 | Gonzalez et al. |
| 2004/0109376 | A1 | | 6/2004 | Lin |
| 2006/0282644 | A1 | * | 12/2006 | Wong ............................ 711/206 |
| 2007/0043924 | A1 | | 2/2007 | Ito et al. |
| 2008/0046675 | A1 | * | 2/2008 | Okada et al. .................. 711/173 |
| 2010/0250839 | A1 | | 9/2010 | Ito et al. |
| 2011/0055458 | A1 | * | 3/2011 | Kuehne ......................... 711/103 |
| 2012/0036313 | A1 | | 2/2012 | Ito et al. |

FOREIGN PATENT DOCUMENTS

| | | | |
|---|---|---|---|
| JP | 2005-196609 | A | 7/2005 |
| JP | 2006-040264 | A | 2/2006 |

(Continued)

OTHER PUBLICATIONS

International Search Report of the International Searching Authority mailed Feb. 22, 2011 for the corresponding international application No. PCT/JP2011/051959 (with English translation).

(Continued)

*Primary Examiner* — Ernest Unelus
*Assistant Examiner* — Ronald Modo
(74) *Attorney, Agent, or Firm* — Posz Law Group, PLC (57) ABSTRACT

A microcomputer retains a group definition table associating the sector sections created by dividing all sectors into multiple sections under a given condition with different memory regions on a flash memory, respectively. A memory control section makes reference to the group definition table to identify a memory region corresponding to a specified sector, and searches the identified memory region range for a physical address corresponding to the specified sector. Furthermore, the memory control section moves a specified sector within the identified memory region range for rewriting data corresponding to the specified sector.

5 Claims, 10 Drawing Sheets

(56) References Cited

FOREIGN PATENT DOCUMENTS

| | | |
|---|---|---|
| JP | 2009-199625 A | 9/2009 |
| JP | 2010-026878 A | 2/2010 |
| JP | 2010-146515 A | 7/2010 |
| WO | 2005/124530 A2 | 12/2005 |

OTHER PUBLICATIONS

Extended European Search Report issued on Jun. 4, 2014 in corresponding EP application No. 11 85 7619 (in English).
Office Action dated Jun. 30, 2015 issued in corresponding CN patent application No. 201180066429.5 (and partial English translation).

* cited by examiner

| GROUP DEFINITION TABLE | | | 132 |
|---|---|---|
| GROUP NUMBER | START ADDRESS | START SECTOR |
| 0 | 0x0000000 | 1 |
| 1 | 0x0030000 | 253 |
| ⋮ | ⋮ | ⋮ |
| 99 | 0x1290000 | 24949 |

| GROUP DEFINITION TABLE | | | | 132 |
|---|---|---|---|
| GROUP NUMBER | START ADDRESS | START SECTOR | NUMBER OF TIMES OF GC |
| 0 | 0x0000000 | 1 | 33 |
| 1 | 0x0030000 | 253 | 420 |
| ⋮ | ⋮ | ⋮ | ⋮ |
| 99 | 0x1290000 | 24949 | — |

| GROUP DEFINITION TABLE | | | | 132 |
|---|---|---|---|---|
| GROUP NUMBER | START ADDRESS | START SECTOR | NUMBER OF TIMES OF GC | |
| 0 | 0x0030000 | 1 | 420 | |
| 1 | 0x1290000 | 253 | — | |
| ⋮ | ⋮ | ⋮ | ⋮ | |
| 99 | 0x0000000 | 24949 | 33 | |

MEMORY CONTROLLER

CROSS REFERENCE TO RELATED APPLICATION

This application is a U.S. national stage application of the International Patent Application No. PCT/JP2011/051959 filed on Jan. 31, 2011.

TECHNICAL FIELD

The present invention relates to a technique of accessing a nonvolatile storage medium such as a flash memory.

BACKGROUND ART

Recently, flash memories, a nonvolatile storage medium, are used with various electronic devices such as information processing devices including personal computers, cellphones, and digital cameras. Also, various techniques for accessing a flash memory have been proposed in the prior art (for example, Patent Literature 1).

The memory card disclosed in Patent Literature 1 comprises a flash memory and a controller controlling the flash memory, wherein the controller can receive, from an external source, a command to write data in the direction that the address increases and detects the last writing position after the writing for the received command. The controller refers to a conversion table presenting the relationship between a sector and the corresponding physical address on a flash memory and searches for the physical address corresponding to the sector (logical data) on the flash memory.

CITATION LIST

Patent Literature

Patent Literature 1: Unexamined Japanese Patent Application Kokai Publication No. 2006-40264.

SUMMARY OF INVENTION

Technical Problem

However, the conversion table designed to make the physical address on a flash memory corresponding to a sector immediately known, as in the technique disclosed in the Patent Literature 1, significantly grows in size as the flash memory size is large. Therefore, it is not easy to use such a conversion table in a microcomputer system requiring a smaller memory or the like.

The present invention is invented to solve the above prior art problem and an exemplary objective of the present invention is to provide a memory controller capable of accessing the physical address corresponding to a specified sector on a readable/writable storage medium such as a flash memory without significantly increasing the size of a table used.

Solution to Problem

In order to achieve the above objective, the memory controller according to the present invention comprises:

memory control means accessing a readable/writable nonvolatile memory and reading and writing data on the basis of a sector unit of a file system established for the nonvolatile memory; and table storage means storing a table associating the sector sections created by dividing all sectors of the file system into multiple sections under a given condition with different memory regions on the nonvolatile memory, respectively, wherein the memory control means:

makes reference to the table to identify a memory region corresponding to a specified sector, and searches the identified memory region range for a physical address corresponding to the specified sector, and moves a specified sector within the identified memory region range for rewriting data corresponding to the specified sector.

Advantageous Effects of Invention

The present invention makes reference to a table associating sector sections with memory regions on a nonvolatile memory in search for a physical address corresponding to a specified sector, whereby the processing can be expedited without significantly increasing the table size.

DESCRIPTION OF EMBODIMENTS

The memory controller according to an embodiment of the present invention will be described in detail hereafter with reference to the drawings.

Figure 1:
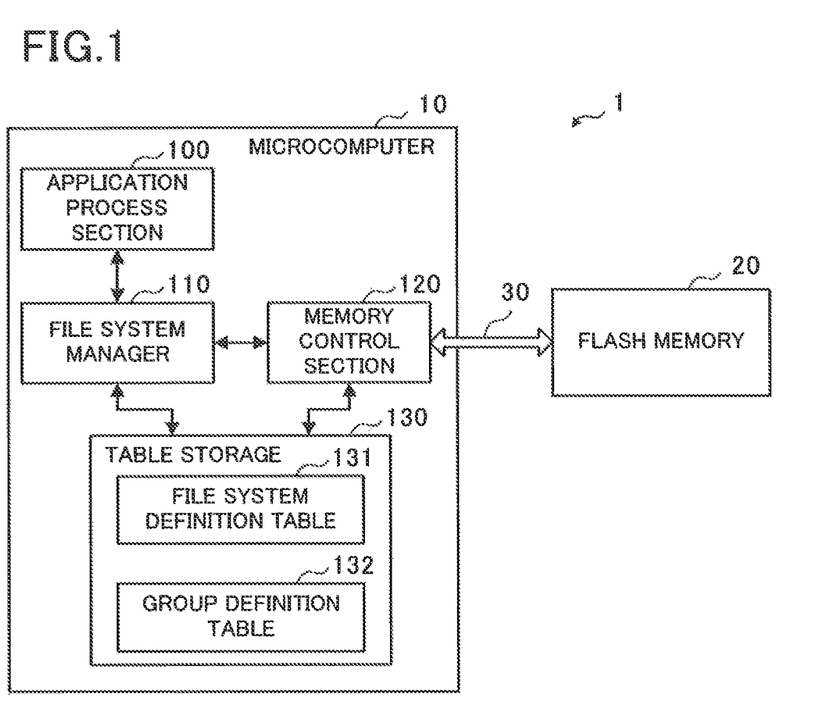
FIG. 1 is a block diagram showing the configuration of a microcomputer functioning as a memory controller according to an embodiment of the present invention.

FIG. 1 is an illustration showing the general configuration of a flash memory system 1 comprising a microcomputer 10 functioning as a memory controller according to this embodiment and a flash memory 20. The microcomputer 10 and flash memory 20 are connected by a data bus 30.

The microcomputer 10 is installed in various electronic devices or various electric appliances and controls the entire operation of the device. The microcomputer 10 comprises, from the viewpoint of hardware, a microprocessor, a ROM (Read Only Memory), a RAM (Random Access Memory), a memory interface, a clock source such as a quartz oscillator (none of the above is shown), and the like.

The microcomputer 10 functionally comprises, as shown in FIG. 1, an application process section 100, a file system manager 110, a memory control section 120, and a table storage 130. The file system manager 110, memory control section 120, and table storage 130 are in charge of the function of the memory controller of the present invention.

The application process section 100 executes the processing according to various application software programs stored on the ROM or the like for realizing the function of the device. The file system manager 110 manages the file system established for the flash memory 20. The memory control section 120 accesses the flash memory 20 according to a request from the application process section 100 via the file system manager 110 to execute various kinds of processing (reading data, writing data and the like).

The data storage 130 stores various tables for defining the file system. In this embodiment, the data storage 130 stores a file system definition table 131 and a group definition table 132. These tables will be described in detail later.

Figure 2:
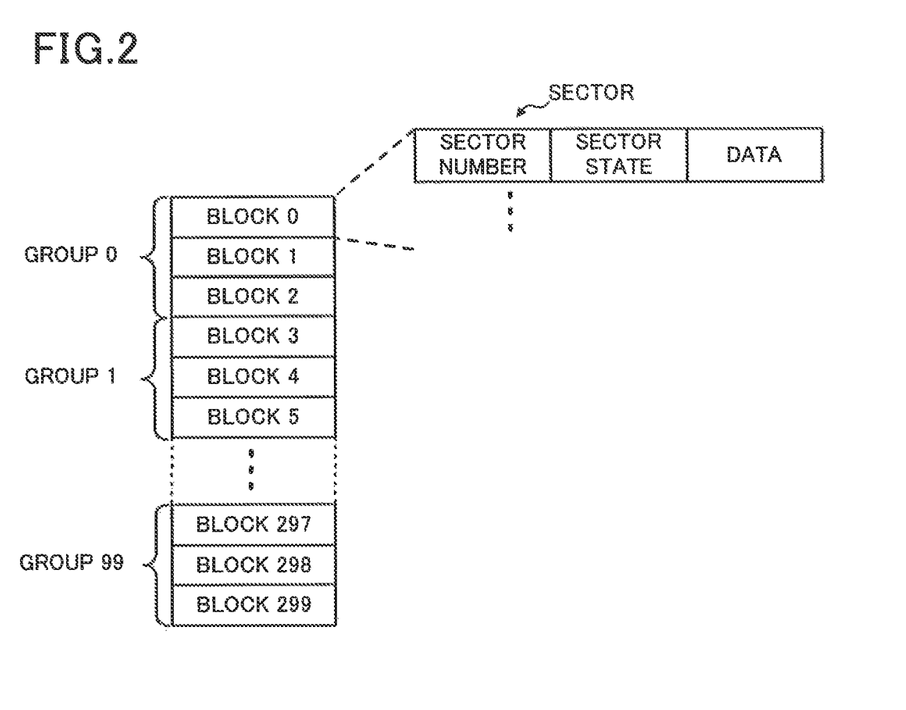
FIG. 2 is an illustration schematically showing a memory structure of the flash memory in FIG. 1.

The memory region of the flash memory 20 comprises multiple blocks as shown in FIG. 2. A block (purging block) is the unit for deleting data. A sector, which is the unit for managing data in the file system, is a division of a block divided to a given size (for example, 520 bytes), comprising a "sector number" region, a "sector state" region, and a "data" region.

The "sector number" region stores a number assigned to each sector (a sector number) managed by the file system. In this embodiment, serial numbers starting from 1 are assigned to the sectors.

The "sector state" region stores information indicating the usage state of the sector (sector state). With reference to the "sector state" region, it is known that the sector is in one of the states "used," "unused" and "deleted." For example, immediately after a block is purged, all sectors in the block are "unused." The "data" region stores data corresponding to the sector number stored in the "sector number" region.

For accessing data stored on the flash memory 20 and corresponding to the sector number specified by the file system manager 110, the memory control section 120 scans the memory region of the flash memory 20 on the basis of a sector unit (for example, 520 bytes) in sequence. Then, the memory control section 120 accesses the "data" region of the sector of which the "sector number" region stores the same sector number as the specified one and the "sector state" region stores information indicating "used."

On the other hand, for writing new data on the flash memory 20, the memory control section 120 allocates one or multiple "unused" sectors corresponding to the data size specified by the file system manager 110 and writes the data.

Furthermore, for overwriting data, the memory control section 120 writes data and a sector number in an "unused" sector different from the "used" sector corresponding to the specified sector number and changes the sector state to "used." Furthermore, the memory control section 120 changes the sector state of the original sector to "deleted."

Figure 3:
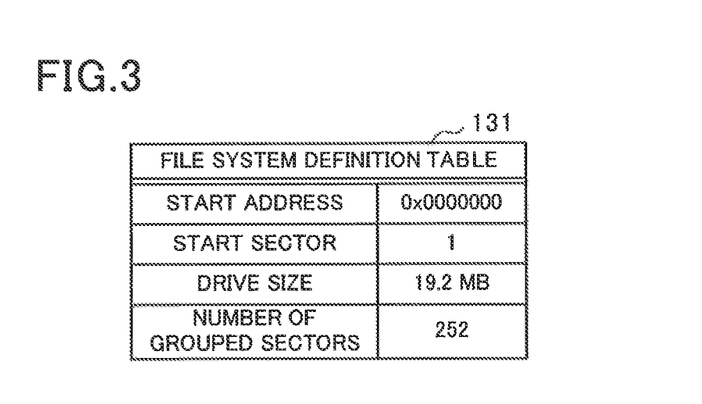
FIG. 3 is an illustration showing an example of a file system definition table.

The file system definition table 131 comprises, as shown in FIG. 3, fields "start address," "start sector," "drive size," "number of grouped sectors," and the like.

The "start address" stores a first address of the memory region of the flash memory 20 (0x0000000 in this embodiment). The "start sector" stores a start sector number (1 in this embodiment). The "drive size" stores a maximum memory capacity of the flash memory 20 managed by the file system (19.2 MB in this embodiment).

The number of sectors usable by the file system as a group comprising a given number of successive blocks is set in the "number of grouped sectors." In this embodiment, when the file system is established, all blocks of the flash memory 20 are divided into groups of three successive blocks from the first one as shown in FIG. 2, and each group is given a group number for identifying the group (serial numbers beginning with 0 in this embodiment). In this embodiment, it is assumed that 252 sectors are usable in a group.

Figure 4:
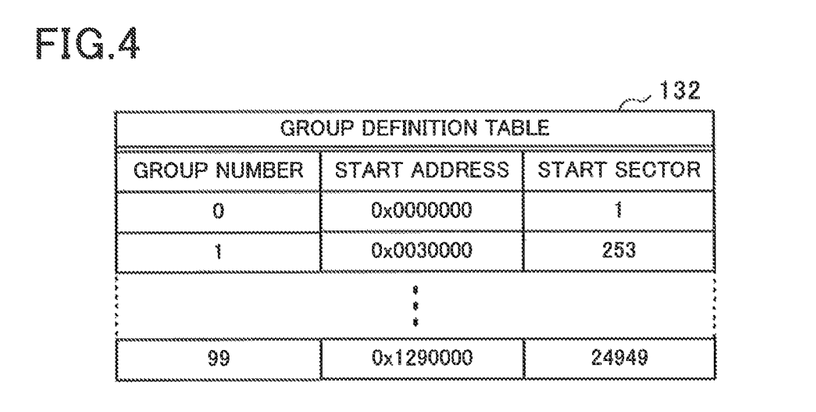
FIG. 4 is an illustration showing an example of a group definition table.

The group definition table 132 comprises, as shown in FIG. 4, fields "group number," "start address," "start sector," and the like.

Figure 5:
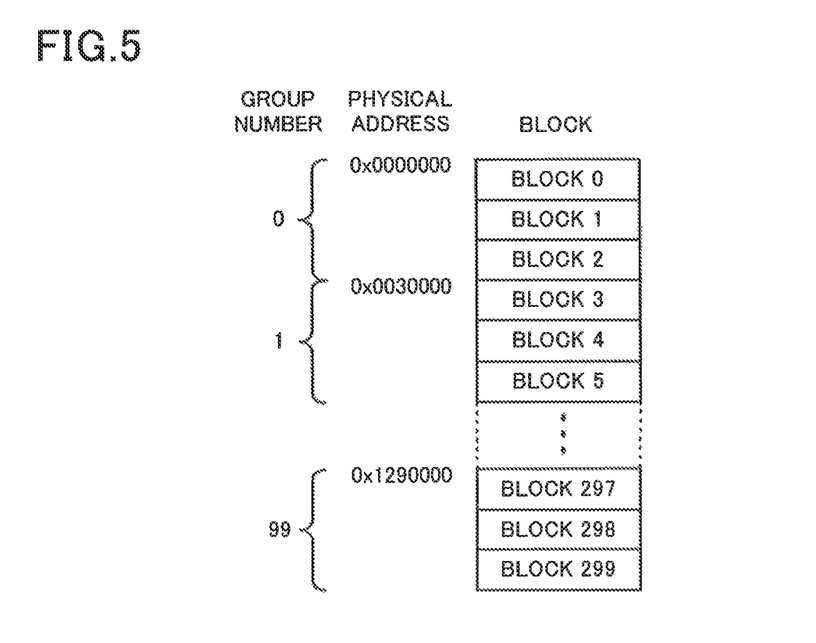
FIG. 5 is an illustration showing the relationship between the beginning of the groups and the physical addresses on the flash memory in the embodiment.

The "group number" stores the group number of each group. The "start address" stores a first physical address of a memory region corresponding to the group on the flash memory 20. In this embodiment, the block size is 64 KB and the group size is 64×3 KB=192 KB. The relationship between the groups and their first physical addresses is as shown in FIG. 5.

The "start sector" stores a first (lowest) sector number among the sectors corresponding to the group (that is, usable sectors). For example, as shown in FIG. 4, the "start sector" of the group having a group number 0 stores 1 and the "start sector" of the group having a group number 1 stores 253.

From the contents of the group definition table 132 shown in FIG. 4, it is understood that, for example, a memory region from 0x0000000 to 0x002FFFF on the flash memory 20 is assigned to the group having a group number 0 and the sectors having sector numbers from 1 to 252 are usable in this embodiment.

The above-described file system definition table 131 and group definition table 132 are created by the file system manager 110, memory control section 120, and/or the like and stored on the table storage 130 at the start of using the flash memory 20, in other words when the file system for the flash memory 20 is established.

Figure 6:
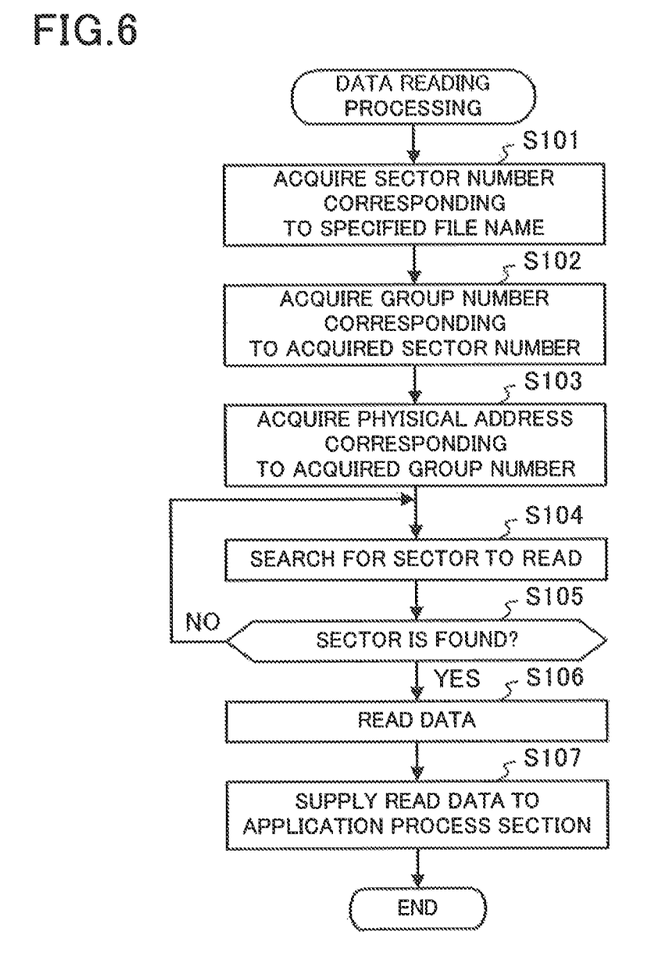
FIG. 6 is a flowchart showing a procedure of a data reading processing.

Operation of reading in (reading out) data from the flash memory 20 in the flash memory system 1 having the above configuration will be described hereafter. FIG. 6 is a flowchart showing a procedure of a data reading processing executed by the file system manager 110 and memory control section 120 of the microcomputer 10. The data reading processing starts as the application process section 100 notifies the file system manager 110 of a data reading request. Here, the application process section 100 specifies the name of a file (a file name) to read in the data reading request.

The file system manager 110 makes reference to a not-shown file information table to acquire the sector number corresponding to the specified file name (Step S101). The file information table is a table associating the file names with the sector numbers and stored on the table storage 130. Here, if a file has a large size and cannot be stored in the "data" region of a sector, the file is divided into multiple pieces of data and stored in different sectors. Therefore, in such a case, the divided data of the same file are associated with different sector numbers in the file information table.

The file system manager 110 notifies the memory control section 120 of the acquired sector number and instructs the memory control section 120 to read the corresponding data.

The memory control section 120 acquires the group number corresponding to the sector number notified from the file system manager 110 (Step S102). Here, the memory control section 120 makes reference to the file system definition table 131 to acquire the group number corresponding to the sector number. More specifically, the memory control section 120 divides the sector number by the value stored in the "number of grouped sectors" of the file system definition table 131. Then, the resultant quotient is the group number corresponding to the sector number.

For example, if the specified sector number is 265, the corresponding group number is 265/252=1.

Then, the memory control section 120 makes reference to the group definition table 132 to acquire the value stored in the "start address" (namely, the first physical address) corresponding to the acquired group number (Step S103). In this embodiment, if the group number is 1, the corresponding physical address is 0x0030000.

The memory control section 120 accesses and scans the flash memory 20 on the basis of a sector unit (for example, 520 bytes) downward (in the direction toward the rear blocks) from the memory region indicated by the acquired physical address in sequence in search for a sector having the same sector number and being "used" (step S104). If the sector is found in this search (step S105: YES), the memory control section 120 reads data from the "data" region of the sector (Step S106).

The memory control section 120 supplies the read data to the file system manager 110 and notifies the file system manager 110 that reading the data has completed. Receiving the notification, the file system manager 110 supplies the data read by the memory control section 120 to the application process section 100 as the required file (Step S107) and notifies the application process section 100 that reading the data has completed; then, the processing ends.

As described above, if a file required from the application process section 100 is divided and stored in multiple different sectors, the file system manager 110 calls on the memory control section 120 to execute the above data reading operation as many times as the number of pieces of divided data. Then, the tile system manager 110 consolidates the multiple read, divided data to restore the original file and supplies the original file to the application process section 100.

Figure 7:
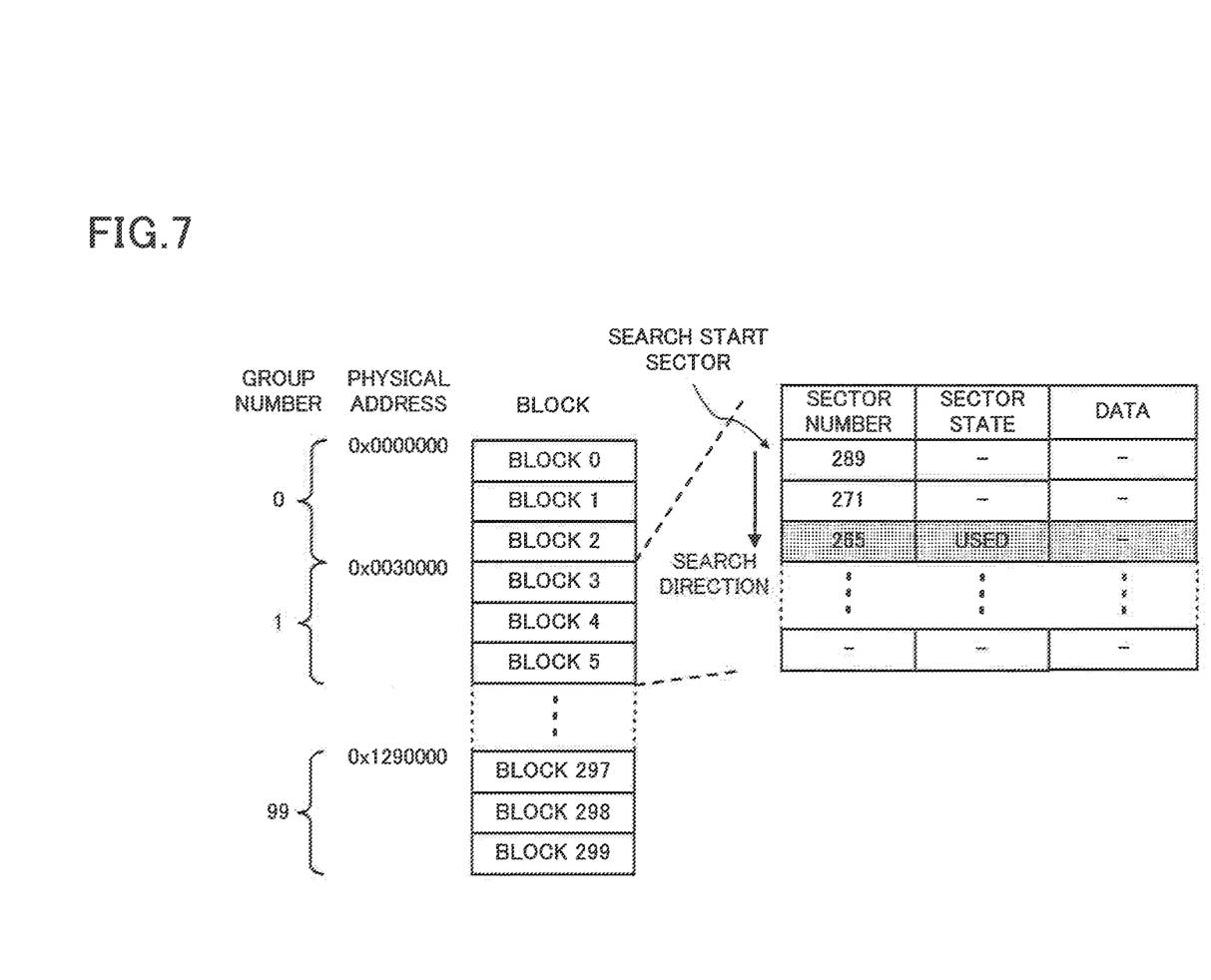
FIG. 7 is an illustration for explaining a specific example of reading data.

FIG. 7 shows a case of reading the sector having a sector number 265 in the above data reading processing. In this case, the memory control section 120 starts searching for the sector from the sector (having a sector number 289) at the first address (0x0030000) of the group 1 (here, the first address of the block 3). Then, the memory control section 120 reads the data in the third sector (having a sector number 265) of the group.

Figure 8:
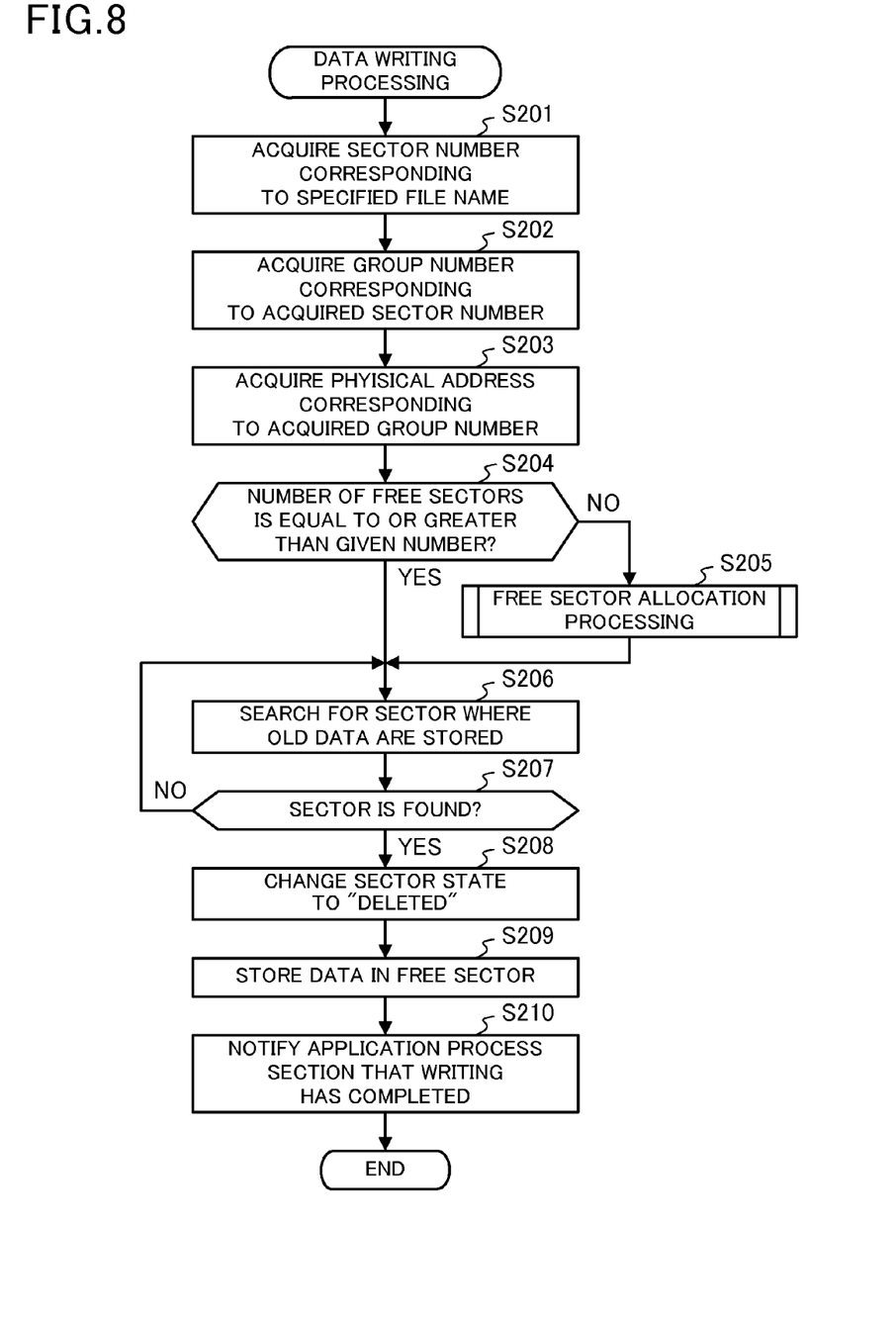
FIG. 8 is a flowchart showing a procedure of a data writing processing.

FIG. 8 is a flowchart showing a procedure of a data writing processing executed by the file system manager 110 and memory control section 120 of the microcomputer 10. The data writing processing starts as the application process section 100 notifies the file system manager 110 of a data writing request. The application process section 100 specifies the name of a file (a file name) to write, data to write, and size of the data in the data writing request.

Here, for writing a new file, nearly the same processing in the prior art is executed. Therefore, the following processing is described in regard to overwriting data. Incidentally, if a new file to write should be divided and stored, it is desirable that the divided data are stored in sectors belonging to the same group.

The file system manager 110 makes reference to the above-mentioned not-shown file information table to acquire the sector number corresponding to the specified file name (Step S201). The file system manager 110 notifies the memory control section 120 of the sector number and data to write.

The memory control section 120 makes reference to the file system definition table 131 to acquire the group number corresponding to the sector number notified from the file system manager 110 (Step S202). Then, the memory control section 120 makes reference to the group definition table 132 to acquire the value (physical address) stored in the "start address" corresponding to the acquired group number (Step S203).

The memory control section 120 accesses and scans the flash memory 20 downward on the basis of a sector unit from the memory region indicated by the acquired physical address in sequence and checks on the state of each sector in all blocks corresponding to the group. Then, the memory control section 120 determines whether the number of "unused" sectors (free sectors) is equal to or greater than a given number (Step S204).

As a result, if the number of free sectors is less than a given number (Step S204; NO), the memory control section 120 executes a free sector allocation processing described later (Step S205). On the other hand, if the number of free sectors is equal to or greater than a given number (Step S204; YES) or after executing the free sector allocation processing, the memory control section 120 scans the memory region, on the basis of a sector unit, downward from the physical address acquired earlier (the first address of the group) in sequence in search for a sector having the same sector number and being "used," namely a sector where the old data are stored (Step S206). If the sector is found in the search (Step S207; YES), the memory control section 120 updates the state of the sector to "deleted" (Step S208).

Furthermore, the memory control section 120 searches for an "unused" sector downward from the first address of the group and writes the data in the found "unused" sector (Step S209). More specifically, the memory control section 120 writes the new data in the "data"region of the found "unused" sector, stores the notified sector number in the "sector number"region of the sector, and changes the sector state to "used."

The memory control section 120 notifies the file system manager 110 that writing the data has completed. Then, the file system manager 110 notifies the application process section 100 that writing the data has completed (Step S210) and the processing ends.

If the file required by the application process section 100 to write has a large size and should be divided and stored in multiple different sectors, the file system manager 110 notifies the memory control section 120 of the divided data and corresponding sector numbers of the file in sequence so that memory control section 120 executes the above-described data writing operation as many times as the number of pieces divided data.

Figure 9:
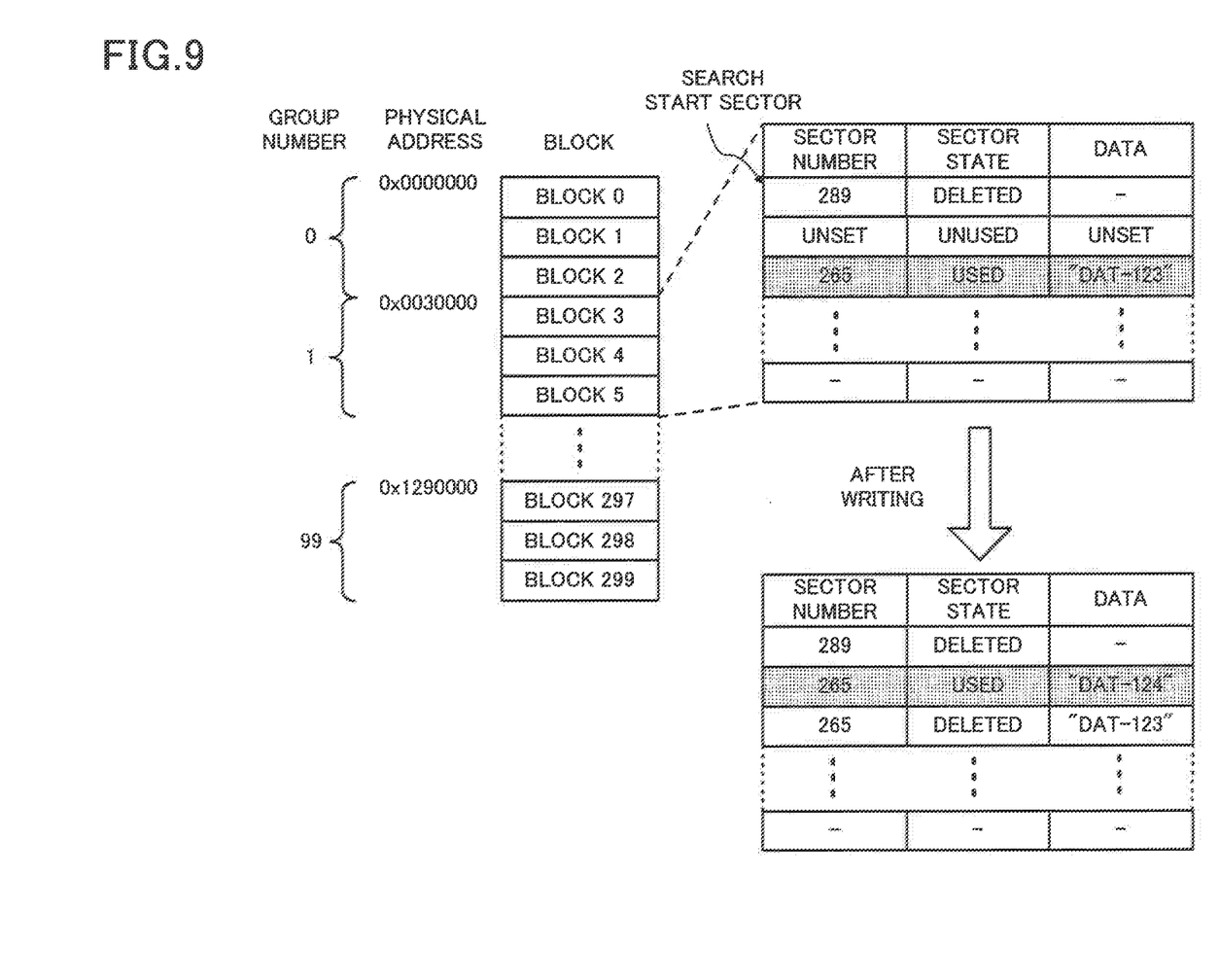
FIG. 9 is an illustration for explaining a specific example of writing data.

FIG. 9 shows a case in which the memory control section 120 writes new data "DAT-124" to overwrite (update) data in the sector having a sector number 265 in the above data writing processing. In this case, the memory control section 120 searches for the sector having a sector number 265 and changes the "sector state" of the sector where old data ("DAT-123") is stored to "deleted." Then, the memory control section 120 searches for a free sector, writes "DAT-124" in the "data" region of the found free sector, stores 265 in the "sector number," and changes the "sector state" to "used."

Figure 10:
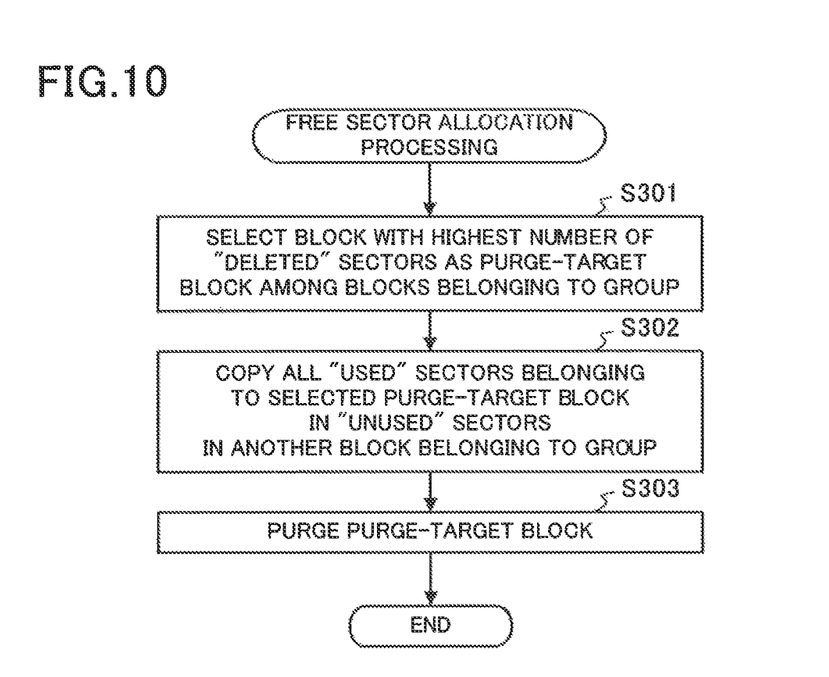
FIG. 10 is a flowchart showing a procedure of a free sector allocation processing.

The above-mentioned free sector allocation processing will be described hereafter with reference to the flowchart in FIG. 10. First, the memory control section 120 selects a block to purge (a purging block) among the blocks belonging to the group (Step S301). Here, the memory control section 120 selects a block including the highest number of sectors of which the sector state is "deleted" in the group as the purging block.

Subsequently, the memory control section 120 copies all "used" sectors belonging to the selected purging block in "unused" sectors of another block belonging to the group (Step S302). Then, the memory control section 120 purges the purging block (Step S303).

As described above, the microcomputer (memory controller) of this embodiment uses a table in which the correspondence between the sector ranges and the physical address ranges on a flash memory is defined in accessing the sector having a specified sector number on the flash memory. Therefore, the search range is narrowed and the sector is efficiently found, whereby the processing is expedited.

Furthermore, the table does not associate every single sector with a physical address, Therefore, the table does not significantly grow even if the flash memory capacity is increased. Then, the present invention is easily applicable even to a microcomputer requiring a smaller memory or the like.

The present invention is not confined to the above embodiment and various changes can be made without departing from the gist of the present invention.

For example, any number, such as two or four or more, of blocks can belong to a group.

Furthermore, the microcomputer 10 of the above embodiment can further comprise the function of leveling the number of times of block purging operation and/or the number of times of rewriting. A modification of the microcomputer 10 (the memory controller) in Embodiment 1 comprising such a function will be described hereafter.

Figure 11:
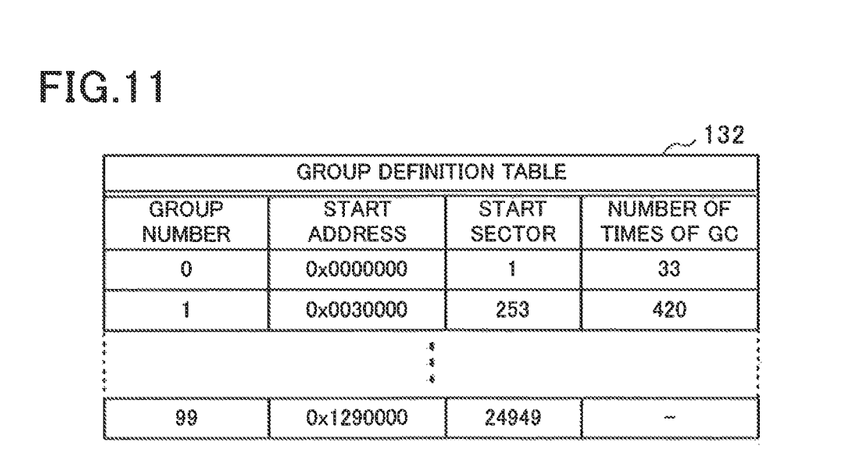
FIG. 11 is an illustration showing an example of a group definition table in a modification of the embodiment.

In such a case, the group definition table 132 retained in the microcomputer 10 additionally includes a field "number of times of GC (garbage collection)" as shown in FIG. 11. Upon executing the above-described free sector allocation procedure, the memory control section 120 of the microcomputer 10 adds the resultant number of times of copying sectors (namely, the number of times of writing data) to the value stored in the "number of times of GC" of the group, In this modification, the relationship between the group number and corresponding physical address is changed as appropriate. Furthermore, the group having a predetermined group number (99 in this embodiment) is used as a temporary group described later.

Figure 12:
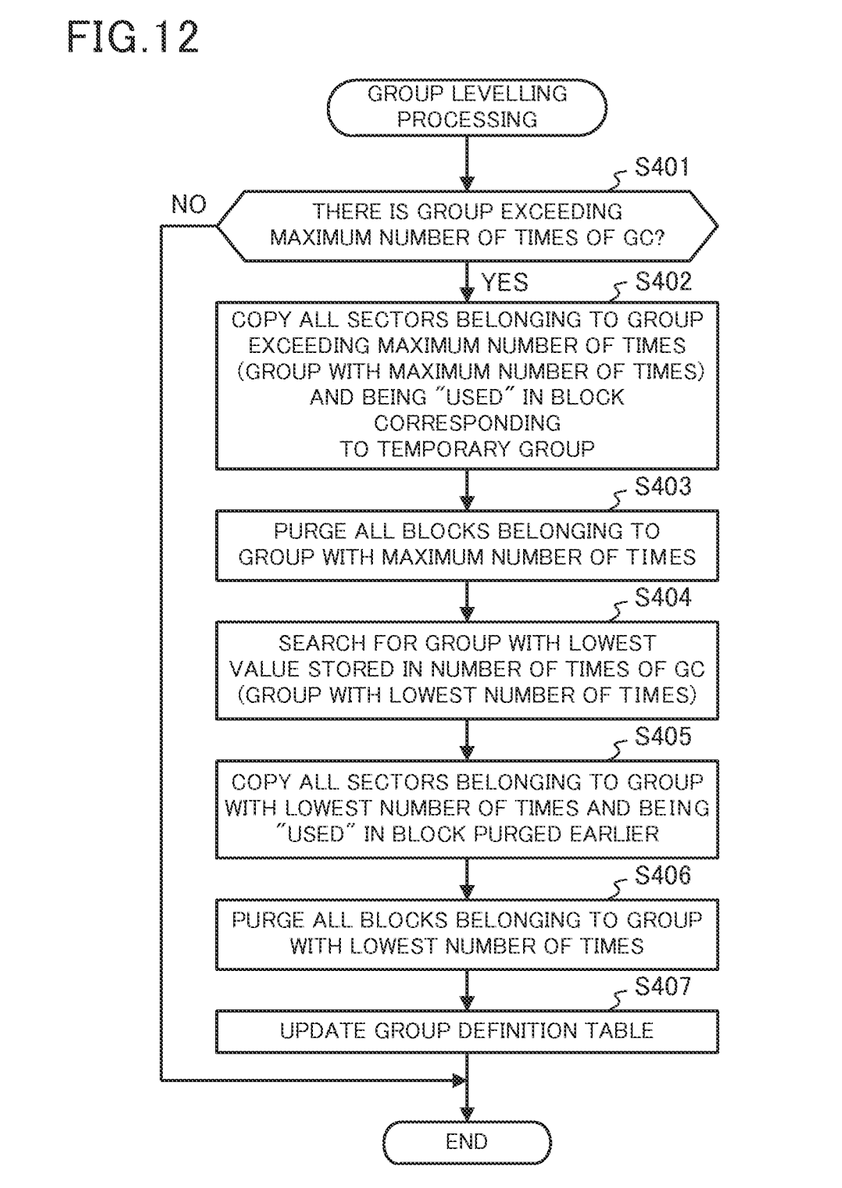
FIG. 12 is a flowchart showing a procedure of a group leveling processing.

FIG. 12 is a flowchart showing the group leveling procedure executed by the memory control section 120 in this modification. The memory control section 120 executes the group leveling procedure at given times (for example, at given time intervals or immediately after the free sector allocation procedure).

First, the memory control section 120 checks on the group definition table 132 to determine whether there is any group of which the value stored in the "number of times of GC" (the accumulated number of times) is greater than a preset maximum number of times of GC (a group with the maximum number of times) (Step S401). As a result, if there is no group with the maximum number of times (Step S401; NO), the processing ends. On the other hand, if there is any group with the maximum number of times (Step S401; YES), the memory control section 120 copies all sectors belonging to the group with the maximum number of times and being "used" in a block corresponding to the temporary group (namely, the group having a group number 99) (Step S402).

Then, the memory control section 120 purges all blocks belonging to the copy source group or the group with the maximum number of times (Step S403). Then, the memory control section 120 searches for a group having the lowest value stored in the "number of times of GC" (a group with the lowest number of times) (Step S404). Then, the memory control section 120 copies all sectors belonging to the found group with the lowest number of times and being "used" in the blocks purged earlier (namely, the blocks belonging to the former group with the maximum number of times) (Step S405).

Then, the memory control section 120 purges all blocks belonging to the copy source group or the group with the lowest number of times (Step S406). These multiple purged blocks will belong to the next temporary group. Then, the memory control section 120 updates the group definition table 132 (Step S407). Here, the "start address" and "number of times of GC" of the group involved in the copying are updated.

A case of the above group leveling procedure will be described hereafter in which the group definition table 132 has the contents shown in FIG. 11, the preset maximum number of times of GC is 400, and the group having a group number 0 has the lowest number of times of GC.

Figure 13:
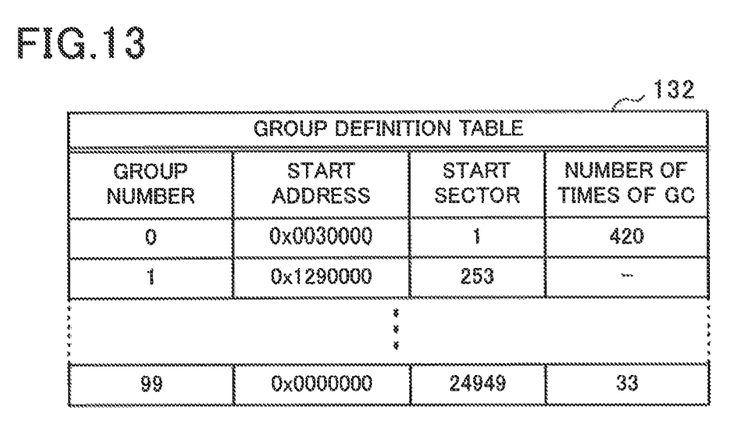
FIG. 13 is an illustration showing an example of the group definition table after the group leveling processing.

In the above case, all sectors belonging to the group having a group number 1 and being in "used" are copied in the blocks corresponding to the group having a group number 99. After all blocks belonging to the group having a group number 1 are purged, all sectors belonging to the group having a group number 0 and being "used" are copied in the blocks purged. After the copying, all blocks belonging to the group having a group number 0 are purged. Then, the contents changed as a result of the copying between the groups are reflected in the group definition table 132. FIG. 13 shows the contents of the group definition table 132 after the group leveling processing is executed.

Provision of the function of leveling the number of times of block purging operation and/or the number of times of rewriting as described above allows the flash memory to have an extended life.

Various embodiments and modifications are available to the present invention without departing from the broad sense of spirit and scope of the present invention. The above-described embodiment is given for explaining the present invention and do not confine the scope of the present invention. In other words, the scope of the present invention is set forth by the scope of claims, not by the embodiments. Various modifications made within the scope of claims and scope of significance of the invention equivalent thereto are considered to fall under the scope of the present invention.

INDUSTRIAL APPLICABILITY

The present invention can preferably be used in various electronic devices using readable/writable storage media such as flash memories.

REFERENCE SIGNS LIST

1 Flash memory system
10 Microcomputer
100 Application process section
110 File system manager
120 Memory control section
130 Table storage
131 File system definition table
132 Group definition table
20 Flash memory
30 Data bus

The invention claimed is:
1. A memory controller, comprising:
a memory control section-that accesses a readable/writable nonvolatile memory and reads and writes data on the basis of a sector unit of a file system established for the nonvolatile memory; and a table storage that stores a table that associates sector sections created by dividing all sectors of the file system into multiple sections under a given condition with different memory regions on the nonvolatile memory, respectively, and with an accumulated number of times obtained by accumulating a number of times of moving the sectors as a result of the execution of a garbage collection, the different memory regions each comprising a plurality of purging blocks, wherein the memory control section:

makes reference to the table to identify a memory region corresponding to a specified sector, and searches the identified memory region range for a physical address corresponding to the specified sector;

moves a specified sector within the identified memory region range for rewriting data corresponding to the specified sector;

writes data; and by executing the garbage collection in which whether a number of free sectors belonging to the identified memory region is equal to or greater than a given number is determined, a purging block is selected as a purging target if the number of free sectors is less than the given number, and all used sectors within the selected purging-target purging block are moved to another purging block in the identified memory region, and purging the purging-target purging block after the execution of the garbage collection, changes a correspondence between the sector sections and the memory regions in the table based on the accumulated number of times.

2. The memory controller according to claim 1, wherein the sector sections in the table each indicates a section comprising a given number of sectors in the order of sector number among the all sectors.

3. The memory controller according to claim 1, wherein for writing data, the memory control section selects a purging block with the highest number of deleted sectors as the purging-target purging block among all purging blocks belonging to the identified memory region when the number of free sectors belonging to the identified memory region is less than the given number.

4. The memory controller according to claim 1, wherein the memory control section changes the correspondence between the sector sections and the memory regions in the table when the accumulated number of times exceeds a given number of times.

5. A memory access method comprising a memory control step that accesses a readable/writable nonvolatile memory and reads and writes data on the basis of a sector unit of a file system established for the nonvolatile memory, wherein in the memory control step:

a table is referred to identify a memory region corresponding to a specified sector, and to search the identified memory region range for a physical address corresponding to the specified sector, wherein the table associates sector sections created by dividing all sectors of the file system into multiple sections under a given condition with different memory regions on the nonvolatile memory, respectively, and with an accumulated number of times obtained by accumulating a number of times of moving the sectors as a result of the execution of a garbage collection, the different memory regions each comprising a plurality of purging blocks;

a specified sector is moved within the identified memory region range for rewriting data corresponding to the specified sector;

for writing data, the garbage collection in which whether a number of free sectors belonging to the identified memory region is equal to or greater than a given number is determined, a purging block is selected as a purging target if the number of free sectors is less than the given number, and all used sectors within the selected purging-target purging block are moved to another purging block in the identified memory region, is executed and the purging-target purging block is purged after the execution of the garbage collection; and a correspondence between the sector sections and the memory regions in the table is changed based on the accumulated number of times.

* * * * *